(12) United States Patent
Wiltse

(10) Patent No.: US 7,174,921 B1
(45) Date of Patent: Feb. 13, 2007

(54) EXTENSION CONDUIT

(76) Inventor: Delane M. Wiltse, North 9419 Rosebud La., Appleton, WI (US) 54915

( * ) Notice: Subject to any disclaimer, the term of this patent is extended or adjusted under 35 U.S.C. 154(b) by 0 days.

(21) Appl. No.: 11/360,340

(22) Filed: Feb. 24, 2006

(51) Int. Cl.
*F16L 9/00* (2006.01)

(52) U.S. Cl. .......................... 138/109; 138/155; 285/8; 285/252; 285/365; 24/273

(58) Field of Classification Search ............... 138/109, 138/155; 285/8, 252; 24/273, 272
See application file for complete search history.

(56) References Cited

U.S. PATENT DOCUMENTS

| | | | | |
|---|---|---|---|---|
| 1,183,285 A | * | 5/1916 | Englund | 24/272 |
| 1,414,731 A | * | 5/1922 | Englund | 24/20 R |
| 1,579,719 A | * | 4/1926 | Lavender | 24/272 |
| 1,971,438 A | * | 8/1934 | Yoder | 285/8 |
| 2,165,926 A | * | 7/1939 | Greene | 285/8 |
| 3,365,218 A | * | 1/1968 | Denyes | 285/253 |
| 3,407,449 A | * | 10/1968 | Tetzlaff et al. | 24/19 |
| 3,408,091 A | * | 10/1968 | Zylstra | 285/7 |
| 3,527,485 A | | 9/1970 | Goward et al. | 285/305 |
| 3,588,148 A | * | 6/1971 | Barsumian | 285/8 |
| 4,007,650 A | | 2/1977 | Wellman | 81/64 |
| 4,541,657 A | | 9/1985 | Smyth | 285/305 |
| 4,721,331 A | | 1/1988 | Lemelshtrich | 285/305 |
| 4,763,932 A | * | 8/1988 | Matz et al. | 285/148.17 |
| 4,872,711 A | | 10/1989 | Weinhold | 285/88 |
| 4,969,923 A | * | 11/1990 | Reeder et al. | 285/365 |
| 5,028,077 A | * | 7/1991 | Hurst | 285/8 |
| 5,230,537 A | * | 7/1993 | Newman | 285/112 |
| 5,524,667 A | | 6/1996 | Potter | 137/343 |
| 5,620,209 A | | 4/1997 | Sauer | 285/23 |
| 6,276,399 B1 | * | 8/2001 | Fox | 138/109 |
| 6,543,812 B1 | | 4/2003 | Chang | 285/81 |
| 6,824,169 B2 | | 11/2004 | Coffman | 285/23 |

* cited by examiner

*Primary Examiner*—Patrick Brinson

(57) ABSTRACT

An extension conduit for providing an extension from a spigot to a hose to distance the hose from the spigot includes a tube having a first end being configured to be in fluid communication with a spigot and a second end being couplable to a hose. A clamp is coupled to the first end of the tube. The clamp slidably receives a male end of the spigot to align the male end of the spigot with said first end of said tube to permit fluid communication between the tube and the spigot.

7 Claims, 2 Drawing Sheets

EXTENSION CONDUIT

BACKGROUND OF THE INVENTION

1. Field of the Invention

The present invention relates to hose end connectors and more particularly pertains to a new hose end connector for providing an extension from a spigot to a hose to distance the hose from the spigot.

2. Description of the Prior Art

The use of hose end connectors is known in the prior art. U.S. Pat. No. 4,872,711 describes a device for allow a hose to be quickly connected to or disconnected from a spigot. Another type of hose end connector is U.S. Pat. No. 4,721, 331 having a connector that is readily coupled to a hose to allow the connector to act as coupler for the hose. Another type of hose end connector is U.S. Pat. No. 5,524,667 having a vertical water conducting component and a horizontal water conducting component for relocating a spigot from a water source.

While these devices fulfill their respective, particular objectives and requirements, the need remains for a device that includes certain improved features to allow a hose to be in fluid communication with a spigot from remote location when the area below the spigot cannot accommodate the hose.

SUMMARY OF THE INVENTION

The present invention meets the needs presented above by generally comprising a tube having a first end being configured to be in fluid communication with a spigot and a second end being couplable to a hose. A clamp is coupled to the first end of the tube. The clamp slidably receives a male end of the spigot to align the male end of the spigot with said first end of said tube to permit fluid communication between the tube and the spigot.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
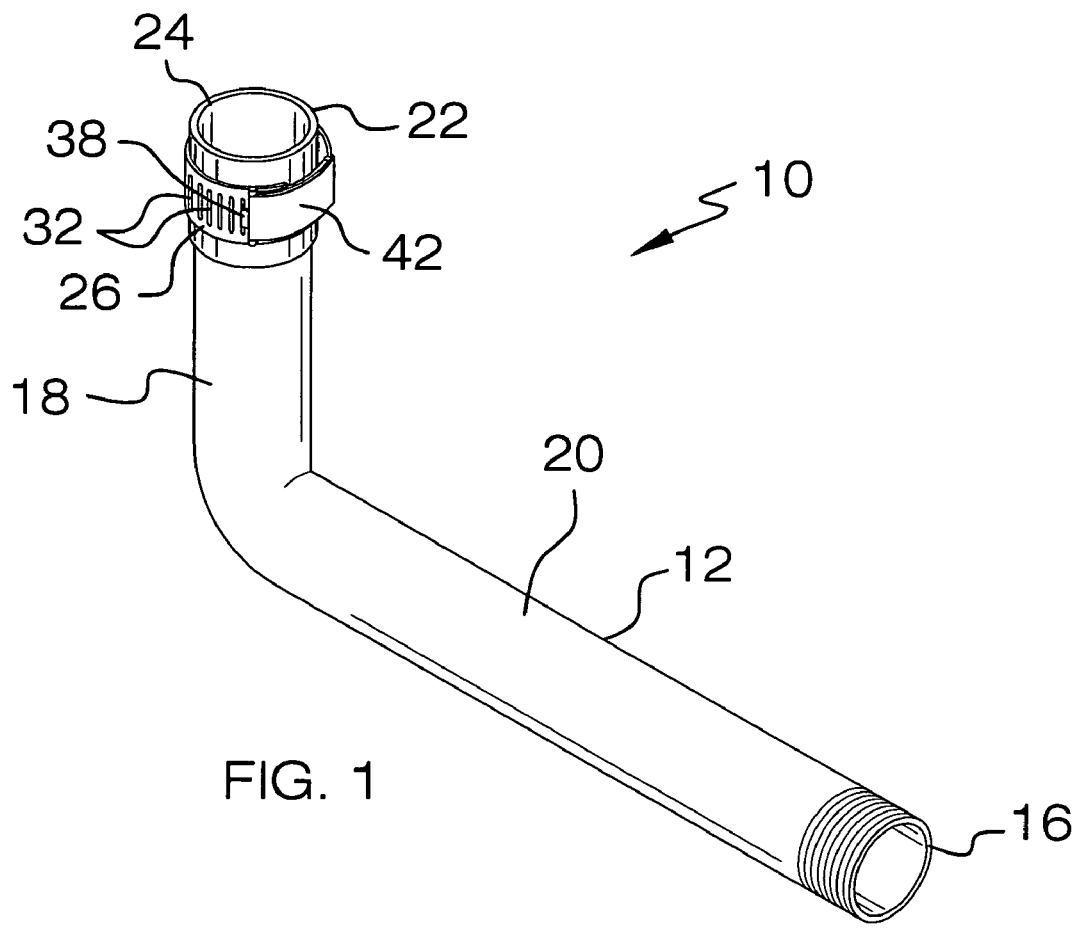
FIG. 1 is a perspective view of a extension conduit according to the present invention.
Figure 2:
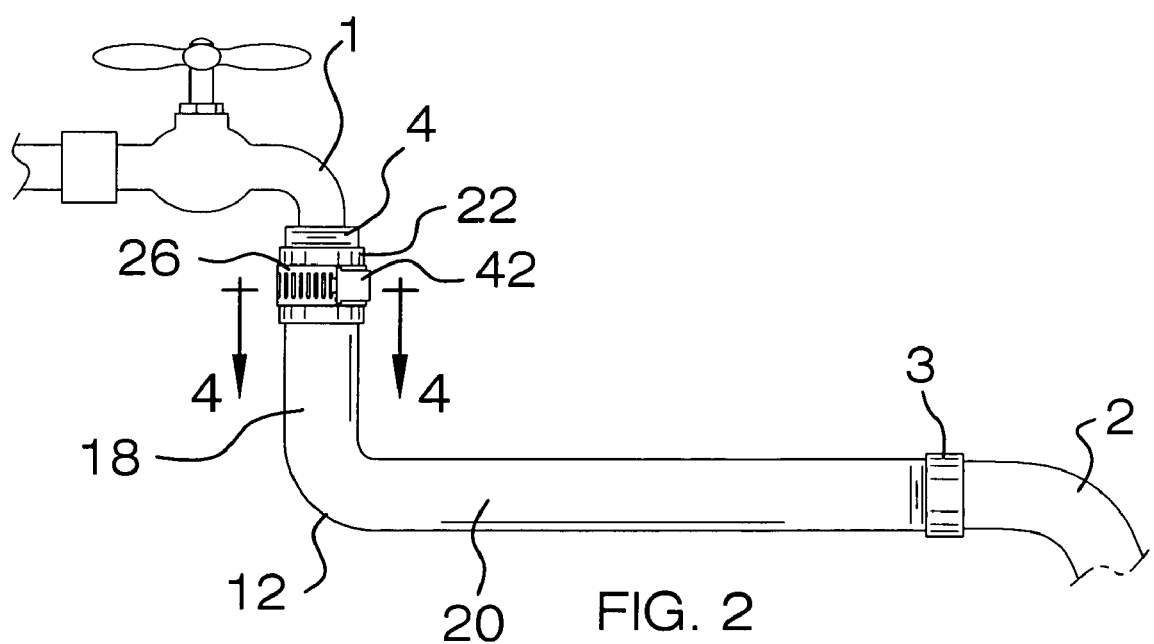
FIG. 2 is a side view of the present invention shown in use.
Figure 3:
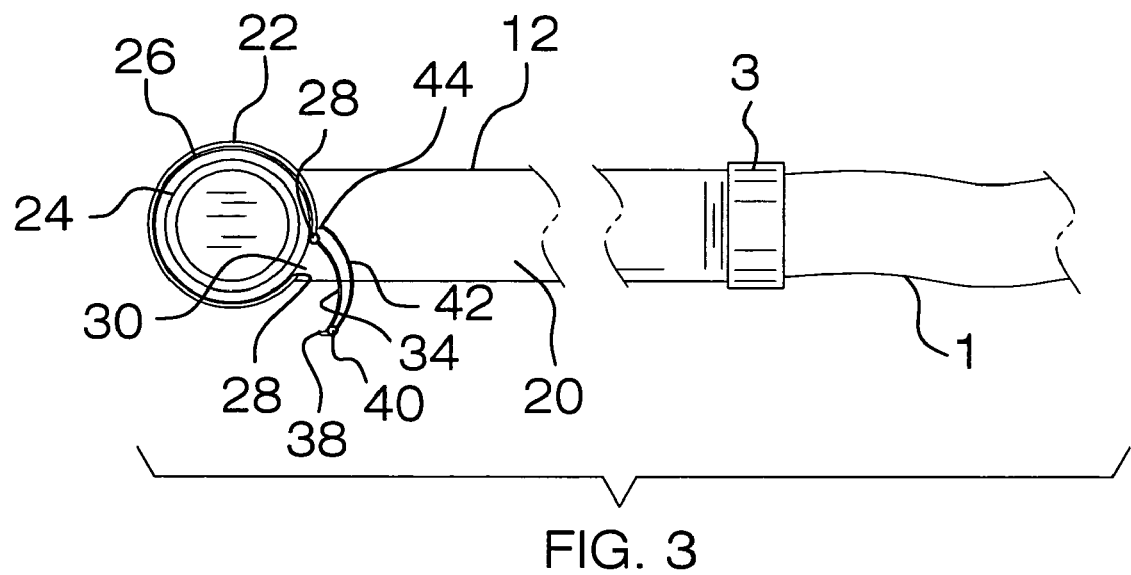
FIG. 3 is a top view of the present invention.
Figure 4:
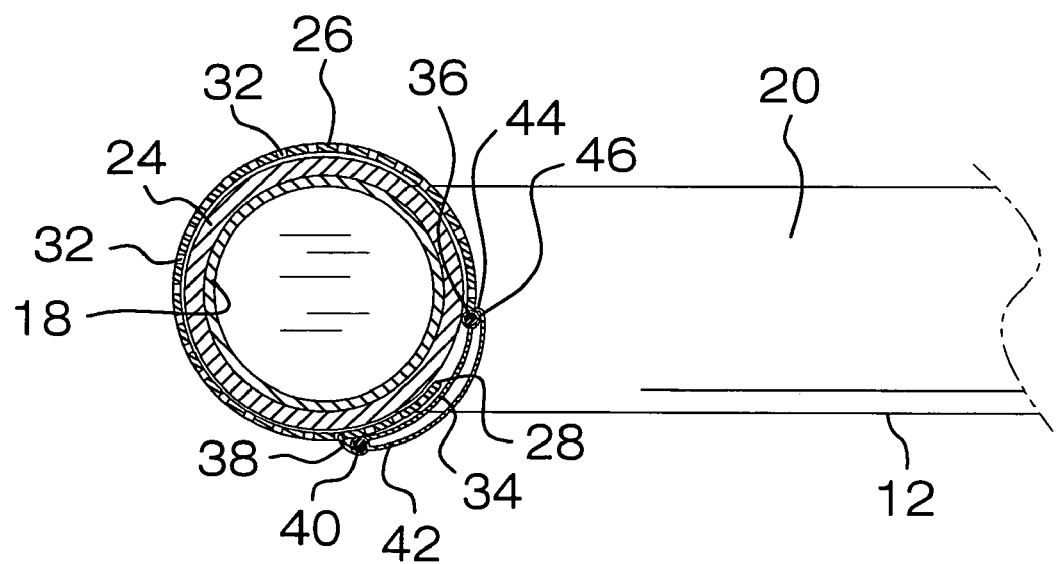
FIG. 4 is a cross-sectional view of the present invention taken along line 4—4 of FIG. 2.

With reference now to the drawings, and in particular to FIGS. 1 through 4 thereof, a new hose end connector embodying the principles and concepts of the present invention and generally designated by the reference numeral 10 will be described.

As best illustrated in FIGS. 1 through 4, the extension conduit 10 generally comprises a tube 12 having a first end 14 is configured to be in fluid communication with a spigot 1 and a second end 16 is couplable to a hose 2. The second end 16 of the tube 12 is threaded to receive a female connector 3 of the hose 2. The tube 12 has a first portion 18 and a second portion 20. The first portion 18 is orientated substantially perpendicular to the second portion 20. The first end 14 is a part of the first portion 18 and positioned opposite the second portion 20. The second end 16 is a part of the second portion 20 and positioned opposite the first portion 18.

A clamp 22 is coupled to the first end 14 of the tube 12. The clamp 22 slidably receives a male end 4 of the spigot 1 to align the male end 4 of the spigot 1 with the first end 14 of the tube 12 to permit fluid communication between the tube 12 and the spigot 1. The clamp 22 includes a sleeve 24 coupled to and extending around the first end 14 of the tube 12. The sleeve 24 slidably receives the male end 4 of the spigot 1. A band 26 is positioned around the sleeve 24. The band 26 has a pair of spaced ends 28. A space 30 between the spaced ends 28 is adjustable to permit a circumference of the band 26 to be adjusted to compress the sleeve 24 around the male end 4 of the spigot 1. The band 26 has a plurality of slots 32 extending along a portion of a width of the band 26 and the slots 32 are arranged between the spaced ends 28.

The clamp 22 also includes a first arcuate plate 34 having a base end 36 hingedly coupled to one of the spaced ends 28 and is extendable over the other of the spaced ends 28. A hook 38 is coupled a free end 40 of the first arcuate plate 34. The hook 38 is selectively inserted into one of the slots 32 of the band 26 to adjust the space 30 between the spaced ends 28 and compress the sleeve 24 around the male end 4 of the spigot 1. The band 26 wants to expand from the compressed state of the band 26 and thus creates tension on the hook 38 which inhibits the hook 38 from sliding out of the associated one of the slots 32. The hook 38 is removed from one of the slots 32 to permit enlargement of the space 30 between the spaced ends 28 to permit expansion of the sleeve 24 and removal of the sleeve 24 from the male end 4 of the spigot 1. A second arcuate plate 42 is hingedly coupled to the free end 40 of the first arcuate plate 34. The second arcuate plate 42 extends back over the first arcuate plate 34. A clip 44 is coupled to a distal end 46 of the second arcuate plate 42 and positioned opposite the first arcuate plate 34. The clip 44 engages the base end 36 of the first arcuate plate 34 when the hook 38 is positioned in one of the slots 32 to inhibit inadvertent removal of the hook 38 from the associated one of the slots 32.

In use, the male end 4 of the spigot 1 is inserted into the sleeve 24. The band 26 is compressed to compress the sleeve 24 around the male end 4 of the spigot 1. The hook 38 is inserted into one of the slots 32 to maintain the band 26 and sleeve 24 in the compressed state. The clip 44 is engaged to the base end 36 of the first arcuate plate 34 to inhibit inadvertent movement of the first arcuate plate 34 which might remove the hook 38 from the associated one of the slots 32 and allow the sleeve 24 to expand and release the male end 4 of the spigot 1. The female end 4 of the hose 2 is then coupled to the second end 16 of the tube 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An extension conduit for being coupled between a spigot and a hose, said conduit comprising:
   a tube having a first end being configured to be in fluid communication with the spigot and a second end being couplable to the hose;
   a clamp being coupled to said first end of said tube, said clamp slidably receiving a male end of the spigot to align the male end of the spigot with said first end of said tube to permit fluid communication between said tube and the spigot, said clamp including;
   a sleeve being coupled to and extending around said first end of said tube, said sleeve slidably receiving the male end of the spigot; and
   a band being positioned around said sleeve, said band having a pair of spaced ends, a space between said spaced ends being adjustable to permit a circumference of said band to be adjusted to compress said sleeve around the male end of the spigot, said band having a plurality of slots extending along a portion of a width of said band and being arranged between said spaced ends; and
   a first arcuate plate having a base end being hingedly coupled to one of said spaced ends and being extendable over the other of said spaced ends, said first arcuate plate engaging one of said slots to secure said first arcuate plate over said space.

2. The conduit according to claim 1, wherein said second end of said tube is threaded to receive a female connector of the hose.

3. The conduit according to claim 1, wherein said tube has a first portion and a second portion, said first portion being orientated substantially perpendicular to said second portion, said first end being a part of said first portion and positioned opposite said second portion, said second end being a part of said second portion and positioned opposite said first portion.

4. The conduit according to claim 1, wherein said clamp includes a hook being coupled a free end of said first arcuate plate, said hook being selectively inserted into one of said slots of said band to adjust said space between said spaced ends and compress said sleeve around the male end of the spigot, said hook being removed from one of said slots to permit enlargement of said space between said spaced ends to permit expansion of said sleeve and removal of said sleeve from the male end of the spigot.

5. The conduit according to claim 1, wherein said clamp includes a second arcuate plate being hingedly coupled to a free end of said first arcuate plate, said second arcuate plate extending back over said first arcuate plate, said second arcuate plate engaging said base end of said first arcuate plate to inhibit inadvertent disengagement of said first arcuate plate from said band when.

6. The conduit according to claim 5, wherein said clamp includes a clip being coupled to a distal end of said second arcuate plate positioned opposite said first arcuate plate, said clip engaging said base end of said first arcuate plate when said first arcuate plate engages one of said slots to inhibit inadvertent removal of said hook from the associated one of said slots.

7. An extension conduit for being coupled between a spigot and a hose, said conduit comprising:
   a tube having a first end being configured to be in fluid communication with the spigot and a second end being couplable to the hose, said second end of said tube being threaded to receive a female connector of the hose, said tube having a first portion and a second portion, said first portion being orientated substantially perpendicular to said second portion, said first end being a part of said first portion and positioned opposite said second portion, said second end being a part of said second portion and positioned opposite said first portion;
   a clamp being coupled to said first end of said tube, said clamp slidably receiving a male end of the spigot to align the male end of the spigot with said first end of said tube to permit fluid communication between said tube and the spigot, said clamp comprising:
      a sleeve being coupled to and extending around said first end of said tube, said sleeve slidably receiving the male end of the spigot;
      a band being positioned around said sleeve, said band having a pair of spaced ends, a space between said spaced ends being adjustable to permit a circumference of said band to be adjusted to compress said sleeve around the male end of the spigot, said band having a plurality of slots extending along a portion of a width of said band and being arranged between said spaced ends;
      a first arcuate plate having a base end being hingedly coupled to one of said spaced ends and being extendable over the other of said spaced ends;
      a hook being coupled a free end of said first arcuate plate, said hook being selectively inserted into one of said slots of said band to adjust said space between said spaced ends and compress said sleeve around the male end of the spigot, said hook being removed from one of said slots to permit enlargement of said space between said spaced ends to permit expansion of said sleeve and removal of said sleeve from the male end of the spigot;
      a second arcuate plate being hingedly coupled to said free end of said first arcuate plate, said second arcuate plate extending back over said first arcuate plate; and
      a clip being coupled to a distal end of said second arcuate plate positioned opposite said first arcuate plate, said clip engaging said base end of said first arcuate plate when said hook is positioned in one of said slots to inhibit inadvertent removal of said hook from the associated one of said slots.

\* \* \* \* \*